United States Patent Office 3,447,548
Patented June 3, 1969

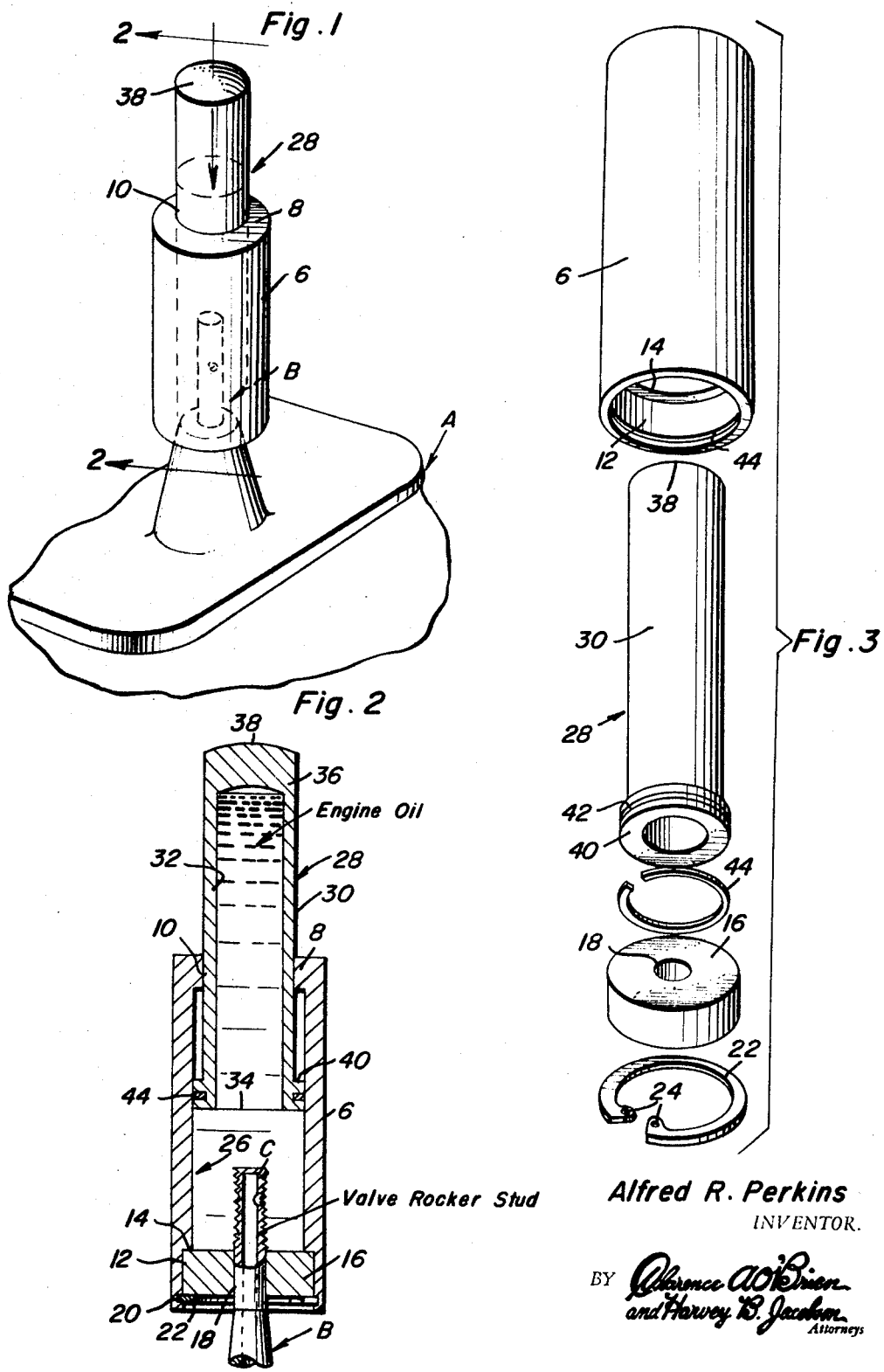

3,447,548
PUMP FOR CLEARING AN OIL PASSAGE
Alfred R. Perkins, 486 W. Union St.,
East Bridgewater, Mass. 02324
Filed Feb. 28, 1967, Ser. No. 619,383
Int. Cl. B08b 9/02; F16n 13/08
U.S. Cl. 134—169                    3 Claims

ABSTRACT OF THE DISCLOSURE

An implement which functions to unclog and clear the oil passage in valve rocker studs used on certain makes of automobiles. It comprises a handtool, a small pump for example, embodying an oil charged cylinder having (1) a stud connecting adapter at its forward end and (2) oil column plunger or piston means at its other end operable by hand or, if necessary, a mallet.

BACKGROUND OF THE INVENTION

This invention relates to an oil passage unclogging and clearing implement, more particularly, a manually usable pump-type tool which is expressly designed and constructed to be temporarily but fittingly attached to valve rocker studs such as are currently used on certain makes of automobile engines and which functions to forcibly pump prescribed engine oil into the passage in a manner to unclog, clear and recondition the clogged stud for unhampered and efficient operation.

PRIOR ART

Many and various types of simple manually actuatable hand pumps for internally clearing and cleaning tubes and pipes in broadly analogous fields of endeavor are old and well known. It is common practice to force-flush a line or pipe with pressurized fluid from a fluid cylinder having a plunger rod operating a follower piston in the fluid charged chamber of the cylinder. More specifically, reference may if so desired be made to Hasson's beer pipe cleaner, Patent 635,961 which is cited here because it, by way of comparison, shows not only the fluid laden cylinder and plunger-type piston but adapter means, a nozzle for instance, on the leading or pipe accommodating end. Despite such prior art hand pumps as have been uncovered, the incentive which has given rise to the instant endeavor has to do with an adaptation which lends itself to the solution of a longstanding problem, that is, unclogging the aforementioned automobile valve rocker studs. To the ends desired, the connectible end of the cylinder lends itself to ready attachment to and disconnection from the hollow stud and, to the best of my knowledge and belief, is the only tool or implement of its kind which has been devised for effective use and acceptable performance.

SUMMARY

Briefly, the pump has such on-the-spot capabilities as may be desired. First, the connectible end of the cylinder is provided with groove means which seats a ring-like adapter collar which in turn is insertable and replaceable and is held in place by an easily accessible snap-ring. Secondly, the piston is provided with a metal or an equivalent packing ring which provides an oil seal between the periphery of the piston and wall of the cylinder. Third, and significant, the reciprocable plunger rod or stem is not only hollow and stores a portion of the passage unclogging and clearing oil, the convex outer end lends itself to safe reception of blows from the user's hand or from a mallet, if necessary.

One objective is to provide a simple practical and expedient hand-actuated pump which better fulfills the purposes for which it has been devised for the reason that the adapter collar is insertable and removable and can be replaced. In fact a number of collars with holes of different diameters can be utilized to accommodate rocker studs of varying cross-sections.

Another aspect and feature of the invention has to do with the employment of a relatively stout stem or rod portion in constructing the plunger and, in so doing, to thus provide a blunt convex surface which can be aptly pounded by the hand of the user. In addition by making the stem hollow it serves as an auxiliary chamber and communicates with the main chamber of the cylinder.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a view in perspective showing a fragmentary portion of an automobile engine and a single valve rocker stud and, what is more important, the novel tool and how it is constructed and adapted to be applied and used.

FIG. 2 is a view on a larger scale with parts in section and elevation taken approximately on the plane of the vertical section line 2—2 of FIGURE 1.

FIG. 3 is an exploded perspective view wherein all of the component parts are shown in coordinating relationship.

With reference again to FIG. 1 the automobile engine is denoted, generally speaking, by the reference character A, the same provided, as is in the case with many makes of automobiles, with valve rocker studs. One such stud is shown at B in FIG. 2 and is of hollow construction with a hole in one side and is therefore considered, insofar as the disclosure is concerned, as conventional. Since these studs vary in cross-sectional dimension it is advisable to employ a hand-actuated implement or pump which lends itself to ready attachment to and disconnection from a stud in the manner suggested in FIGS. 1 and 2. In carrying out a preferred embodiment of the invention a stout cylinder is provided as at 6, the upper end 8 being provided with a central plunger-type guide opening 10. The lower open end portion of the cylinder is counterbored to provide an endless channel or recess 12 which in turn provides a limit stop shoulder 14 for the insertable and removable washer-like adapter. More specifically the adapter comprises a collar 16 which is of a diameter and cross-section to fit with requisite nicety in the recess with a surface thereof having end thrust contact with the stop shoulder 14. The collar is provided at its center with a circular hole 18 which is of a prescribed diameter so that it can be fittingly mounted over the exposed end portion C of the aforementioned stud. The recessed portion is also provided with an endless groove 20 to accommodate a resilient retainer which more specifically comprises a resilient snap ring 22 with apertured lugs or ears 24 and which is snapped into the groove 20 in a manner to removably retain the collar 16 in place. With this arrangement the adapter collar lends itself to removal and replacement so that a collar of a suitable size can be utilized depending on the size of the stud which is to be unclogged and opened up.

The hollow portion of the cylinder between the collar 16 and apertured end 8 constitutes and provides a chamber for the engine oil, said chamber denoted by the numeral 26.

The aforementioned plunger is denoted by the numeral 28 and is proportional in size and dimension with the chambered cylinder. It comprises a hollow elongated cylindrical body portion which is here designated as a stem 30, the hollow part thereof providing an auxiliary chamber 32 which is communicable with the chamber 26. The chamber 32 is open at its inward end as at 34 and has unobstructed communication with the chamber 26, both chambers being charged, at the time of use, with a supply of engine oil. The closed end of the hollow stem, that is the end 36 has a blunt convexly rounded surface 38 which provides an impact element for the blow imparted thereto by the palm of the user's hand when the oil dispensing step is undertaken. The open-ended part of the stem is formed with an endless outstanding flange 40 which constitutes a piston and whose outer periphery has slidable but wiping contact with the interior of the cylinder. This piston is provided with an endless groove 42 for reception and retention of the packing ring 44. The outside diameter of the stem is such the stem can be slid effectively through the stem guide opening 10. It will be obvious that the open end 34 of the stem permits the stem to be fully depressed, that is forced down into the chamber 26 and allows the stud to telescope ino the auxiliary oil containing chamber 32.

In use the unfilled device (cylinder and plunger) is turned upside down and is then filled with engine oil through the adapter hole 18. After the unit has been filled it is properly lined up and then quickly pressed down over the valve rocker stud in the manner shown in FIGS. 1 and 2. A firm push by the hand on the blunt impact surface 38 will then force oil out through the combined chambers 26 and 32 and will unclog and clear the passage in the stud in what is believed to be an evident manner. If hand strength is not sufficient to clear the passage the plunger can be struck with a mallet capable of developing the degree of pressure that may be required in stubborn cases. It follows that the device is designated to clear clogged passages in valve rocker studs in a highly satisfactory manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use when called upon to unclog and clear an oil passage in an automobile engine valve-rocker-stud of the type described: a readily attachable and detachable pump embodying a cylinder adapted to be charged with a given supply of passage flushing and clearing engine oil, said cylinder having adapter means at the end thereof which is adapted to be communicatively but separably connected with said stud, a reciprocable plunger embodying (1) a piston fittingly slidable in the hollow oil containing chamber of said cylinder and (2) a stem carrying said piston and slidable in a guide opening provided at the other end of said cylinder, said pump being manually attachable and detachable, and the stem of said plunger being of a cross-section and having a blunt convex end which can be comfortably and safely pounded by the user's hand if and when so desired, said piston having a peripheral ring groove and a packing ring retentively but replaceable seated in said groove and having reciprocable wiping but effectually sealed contact with the incircling wall of said cylinder, said piston being hollow, closed at its outer end and open at its inner end and communicable at said inner end with the coacting chamber of said cylinder and accordingly having the capability of receiving and temporarily containing a portion of the flushing and clearing oil, and said adapter comprising an insertable and removable ring-like collar which is held in its given position in said cylinder by an applicable and removable retainer ring.

2. For use when called upon to unclog and clear an oil passage in an automobile engine valve-rocker-stud of the type described: a readily attachable and detachable pump embodying a cylinder adapted to be charged with a given supply of passage flushing and clearing engine oil, said cylinder having a stem guide opening at its upper end and being wholly open at its lower end and counterbored to provide an endless annular adapter seating recess with a limit stop shoulder and a companion snap-ring groove, an insertable and removable collar fitted into said seating recess, butting said shoulder and providing a manually attachable and detachable adapter, a resilient snap-ring seated in said groove and butting and retaining said adapter collar in its ready-to-function position, and a reciprocable plunger embodying a piston fittingly slidable in the hollow oil containing chamber of said cylinder and a stem integral with and constituting an operable part of said piston, said stem being slidably operable in the aforementioned guide opening.

3. The pump according to and defined in claim 2 and wherein said stem is hollow and provides an auxiliary oil chamber open at an inner end and closed at the outer end, the closed outer end being externally blunt and convex whereby to permit it to be comfortably and safely pounded by the palm of the user's hand or, alternatively, struck and operated by a mallet.

References Cited

UNITED STATES PATENTS

| | | |
|---|---|---|
| 635,961 | 10/1899 | Hasson. |
| 1,238,269 | 8/1917 | Cornwell. |
| 1,861,899 | 6/1932 | Beach. |
| 1,945,555 | 2/1934 | Kreidel _____ 222—386 |
| 2,537,215 | 1/1951 | Dunn. |
| 2,747,513 | 5/1956 | Atkinson. |
| 2,955,627 | 10/1960 | Gaskins _____ 222—386 XR |
| 3,081,785 | 3/1963 | Lonardo. |
| 3,290,946 | 12/1966 | Pursell _____ 222—386 XR |

DANIEL BLUM, *Primary Examiner.*

U.S. Cl. X.R.

141—383; 184—38